(12) United States Patent
Yeh et al.

(10) Patent No.: US 7,108,275 B2
(45) Date of Patent: Sep. 19, 2006

(54) SINGLE HAND FOLDING STRUCTURE FOR UMBRELLA FOLDING STROLLER

(75) Inventors: Chuan-Ming Yeh, Chia Tai Industrial Tai Pao City (TW); Youn-Fu You, Chia Tai Industrial Tai Pao City (TW); Wei-Yeh Li, Chia Tai Industrial Tai Pao City (TW)

(73) Assignee: Link Treasure Limited, Tortola (VG)

( * ) Notice: Subject to any disclaimer, the term of this patent is extended or adjusted under 35 U.S.C. 154(b) by 0 days.

(21) Appl. No.: 11/059,514

(22) Filed: Feb. 16, 2005

(65) Prior Publication Data

US 2005/0212264 A1  Sep. 29, 2005

(30) Foreign Application Priority Data

Feb. 18, 2004  (TW)  ............... 93202330 U

(51) Int. Cl.
*B62B 1/00*  (2006.01)
(52) U.S. Cl. .................. 280/647; 280/650; 280/657
(58) Field of Classification Search ................ 280/642, 280/649, 641, 646, 650, 654, 657, 658, 47.38, 280/639, 647; 16/429, 113.1, 405
See application file for complete search history.

(56) References Cited

U.S. PATENT DOCUMENTS

| 3,995,882 | A | * | 12/1976 | Watkins ................ 280/649 |
| 4,019,757 | A | * | 4/1977 | Beger et al. ............ 280/649 |
| 4,042,249 | A | * | 8/1977 | Kassai ................... 280/38 |
| 4,111,454 | A | * | 9/1978 | Kassai ................... 280/649 |
| 4,118,052 | A | * | 10/1978 | Cabagnero ............. 280/642 |
| 4,152,010 | A | * | 5/1979 | Kassai ................... 280/650 |
| 4,171,829 | A | * | 10/1979 | Toda .................... 280/649 |
| 4,266,807 | A | * | 5/1981 | Griffin .................. 280/650 |
| 4,353,577 | A | * | 10/1982 | Giordani ............... 280/642 |
| 4,386,790 | A | * | 6/1983 | Kassai ................... 280/650 |
| 4,648,651 | A | * | 3/1987 | Hawkes ................. 297/45 |
| 4,753,453 | A | * | 6/1988 | Schilbach .............. 280/643 |
| 4,930,697 | A | * | 6/1990 | Takahashi et al. ....... 280/47.38 |
| 4,986,564 | A | * | 1/1991 | Liu ..................... 280/642 |
| 5,288,098 | A | * | 2/1994 | Shamie ................. 280/642 |
| 5,535,483 | A | * | 7/1996 | Jane Cabagnero ........ 16/429 |
| 5,863,061 | A | * | 1/1999 | Ziegler et al. ........... 280/642 |
| 6,322,098 | B1 | * | 11/2001 | Lan ..................... 280/642 |
| 6,375,213 | B1 | * | 4/2002 | Suzuki .................. 280/649 |
| 6,386,575 | B1 | * | 5/2002 | Turner .................. 280/647 |
| 6,776,433 | B1 | * | 8/2004 | Harrison et al. ......... 280/647 |
| 6,811,178 | B1 | * | 11/2004 | Tomasi et al. .......... 280/650 |
| 6,877,762 | B1 | * | 4/2005 | Yamazaki .............. 280/647 |
| 2003/0155746 | A1 | * | 8/2003 | Watkins ................ 280/650 |

* cited by examiner

*Primary Examiner*—Hau Phan
(74) *Attorney, Agent, or Firm*—Alan D. Kamrath; Nikolai & Mersereau, P.A.

(57) ABSTRACT

A single hand folding structure for an umbrella folding stroller includes a connecting element is utilized to connect between a single hand release structure and a driving piece of a folding set. The single hand release structure is disposed on a handle bar of a frame of the umbrella folding stroller so as to allow a user to directly operate with a single hand to release the folding set. An elastic element of the frame is utilized to assist the partial folding of the frame such that the user can directly push the handle bar to fold the frame. Thus, the user avoids using a foot to release the frame to fold and, subsequently, prevents damage to shoes.

20 Claims, 7 Drawing Sheets

(PRIOR ART)

SINGLE HAND FOLDING STRUCTURE FOR UMBRELLA FOLDING STROLLER

FIELD OF THE INVENTION

The present invention relates to a single hand folding structure for an umbrella folding stroller. In particular, a connecting element is utilized to connect between a single hand release structure and a driving piece of a folding set. The single hand release structure is disposed on a handle bar of a frame of the umbrella folding stroller so as to allow a user to directly operate with a single hand to release the folding set. An elastic element disposed on the frame assists the frame to be folded partially, and the user may push the handle bar directly for folding the frame.

BACKGROUND OF THE INVENTION

Strollers are designed for carrying babies around. Conventional strollers have a foldable structure so as to reduce the overall size of the stroller when carried around or when in storage.

The conventional foldable strollers, as shown in FIG. 1, have various types and forms and are divided into transport strollers and umbrella folding strollers according to the collapsed condition. The umbrella folding strollers employ a frame 90 utilizing a pair of lower cross tubes 92 and a folding set 93 so as to fold the two sides of the frame 90 as an umbrella. The main purpose is to reduce the size of the stroller when carried around or when in storage. However, when a conventional umbrella folding stroller is folded, the folding set 93 disposed on the bottom of the back of the frame 90 is utilized so as to control the folding of the frame 90 of the stroller. The conventional folding set 93 includes two pairs of upper and lower steel pieces 94, 95, a conduit piece 96, a pair of connecting steel pieces 97, a driving piece 98, and a paddle 99. When the frame 90 is folded, the folding set 93 is subsequently folded by lifting the paddle 99 using the top surface of the user's shoe. The conduit piece 96 simultaneously folds the upper and lower steel pieces 94, 95 into an inverted V shape, so that the driving piece 98 pushes said pair of connecting steel pieces 97 to close the two sides of the frame 90 inward. Then, the user pushes the handle bar 91 so as to form the folding position of the frame 90. In contrast, when the user expands the frame 90 the user steps on the paddle 99 such that each steel piece 94. 95. 97 is expanded toward an opposite direction so as to form the expanding position. However, the folding process is very inconvenient, and the user's shoe may be damaged during the process.

SUMMARY OF THE INVENTION

The main object of the present invention is to overcome the inconvenience of folding the conventional folding stroller by foot and the issue of damaging the user's shoes. The present invention mainly uses a connecting element, having an end connected to the single hand release structure disposed on the handle bar of the frame and the other end connected to a driving piece of the folding set. Thus, the user can directly use the single hand release structure to pull the driving piece and, thus, release the folding set without using their foot. In addition, the present invention provides an elastic element between the tubes or on the folding set so that when the user releases the locking device of the folding set through the single hand release structure, the elastic element can use the elasticity to assist the partial folding of the frame of the stroller. Therefore, the user can directly push the handle bar so as to fold the frame of the stroller.

DETAILED DESCRIPTION OF THE EMBODIMENTS

Figure 1:
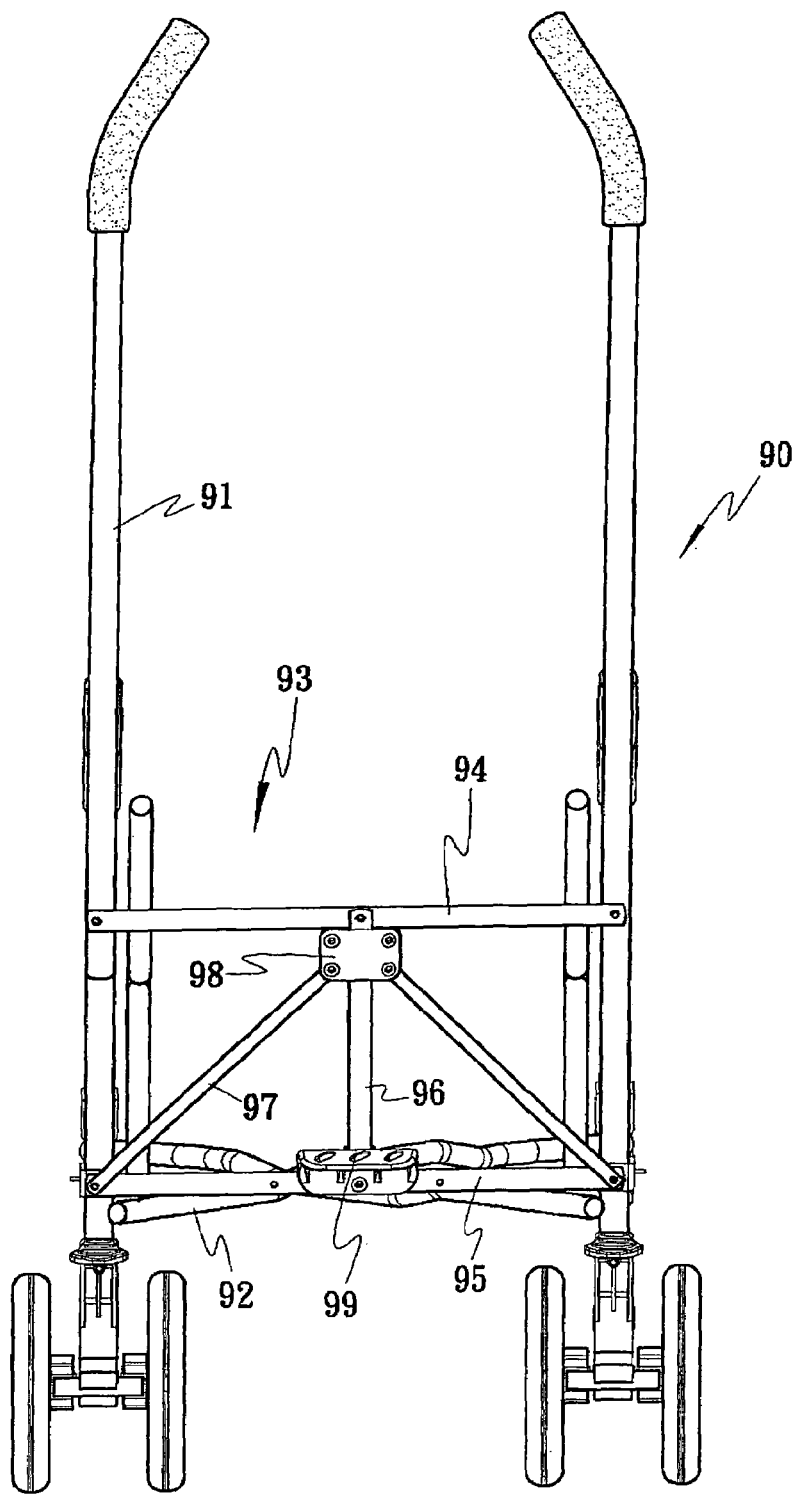
FIG. 1 is a schematic view of the back of the conventional frame of the umbrella folding stroller expanded.
Figure 2:
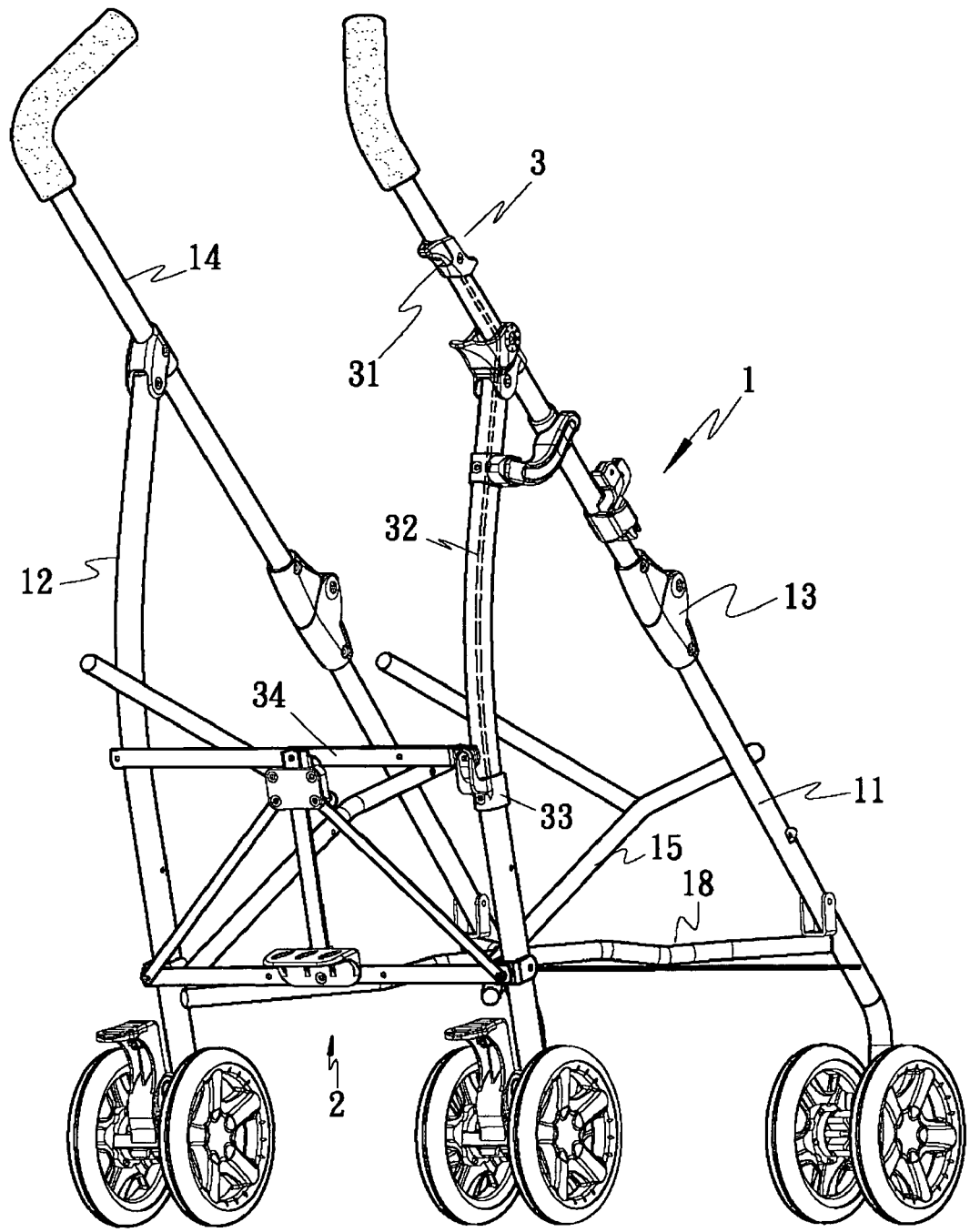
FIG. 2 is a three dimensional rear view of the present invention.
Figure 3:
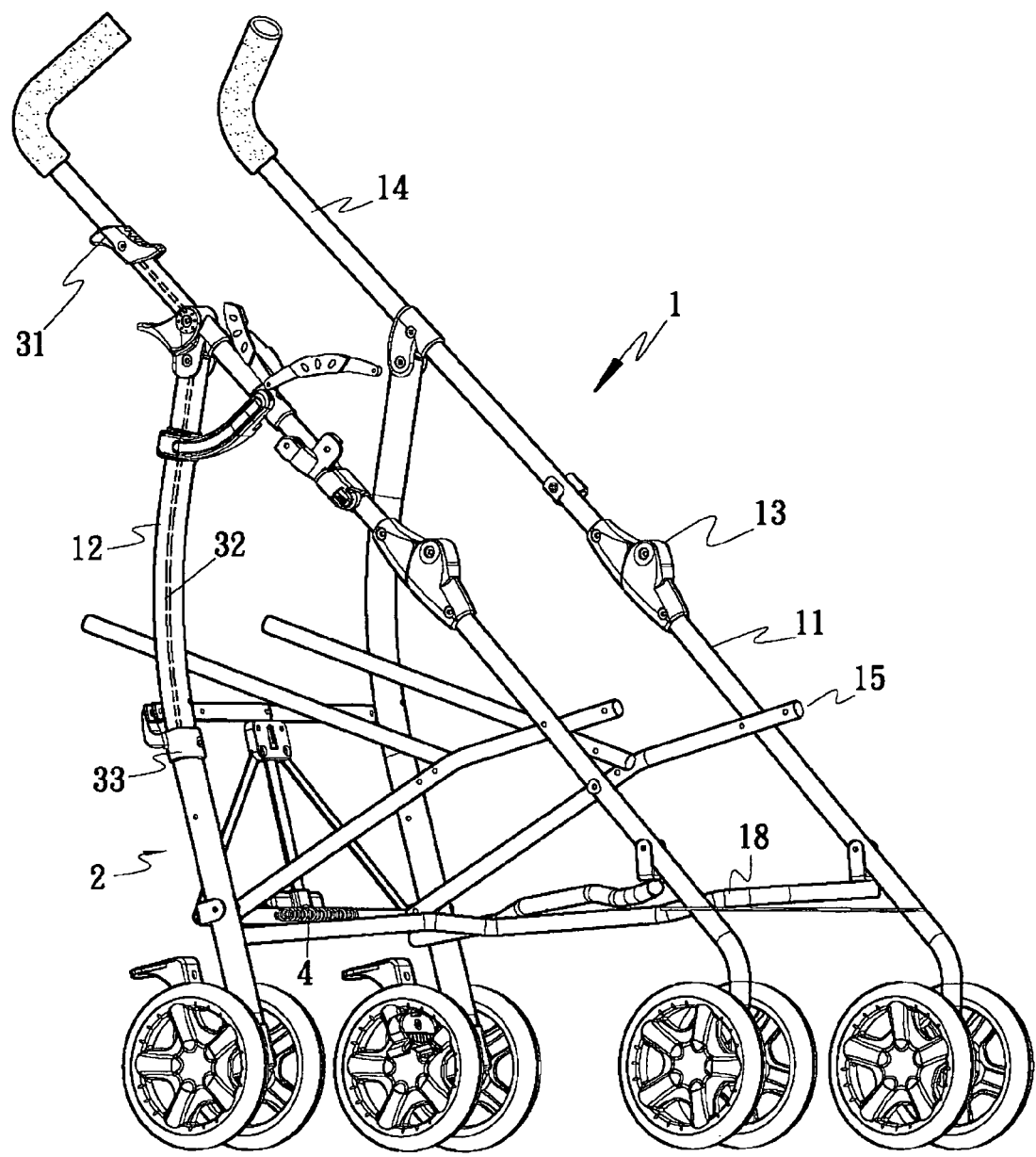
FIG. 3 is a three dimensional front view of the present invention.
Figure 4:
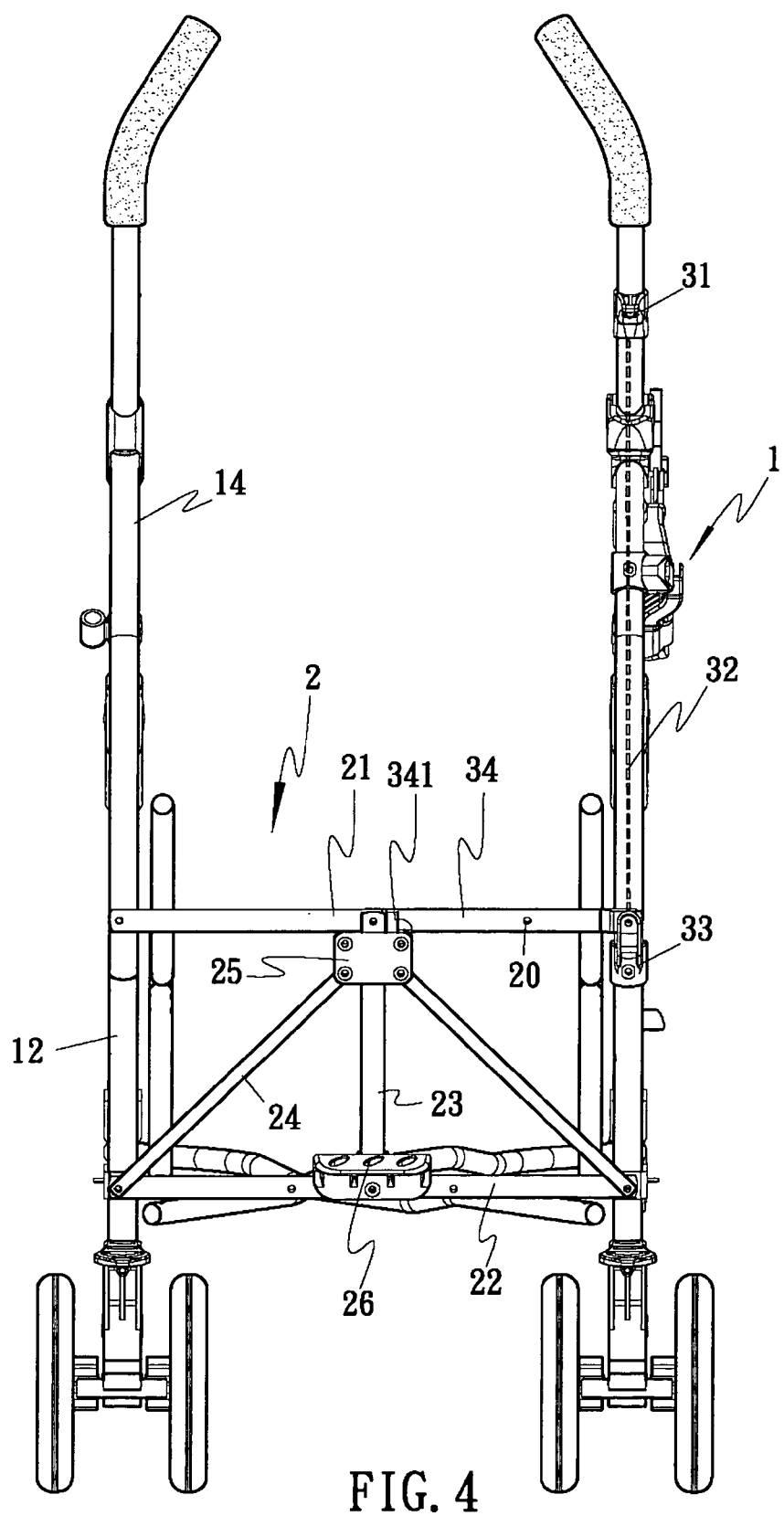
FIG. 4 is a schematic back view of the present invention.

Referring to FIGS. 2, 3, and 4, the present invention provides a single hand folding structure for an umbrella folding stroller so as to allow a user to fold a frame 1 of the stroller by a single hand, without using a foot to release the frame 1. The present invention includes the frame 1 of the umbrella folding stroller, a folding set 2, a single hand release structure 3, and an elastic element 4.

The stroller frame 1 may be extendable for operation and folded transversely and longitudinally for storing. The frame 1 includes front and rear leg tubes 11, 12 connected to each other, a joint set 13, a handle bar 14, a seat tube 15, a folding set 2, a lower cross tube 18. The lower cross tube 18 and the folding set 2 are pivotally coupled on a lower side and a rear side between two sides of the frame 1: respectively, for supporting the frame 1 of the umbrella folding stroller. When the frame 1 is collapsed, the left and right sides of the frame 1 are driven to folding transversely and longitudinally.

Figure 5:
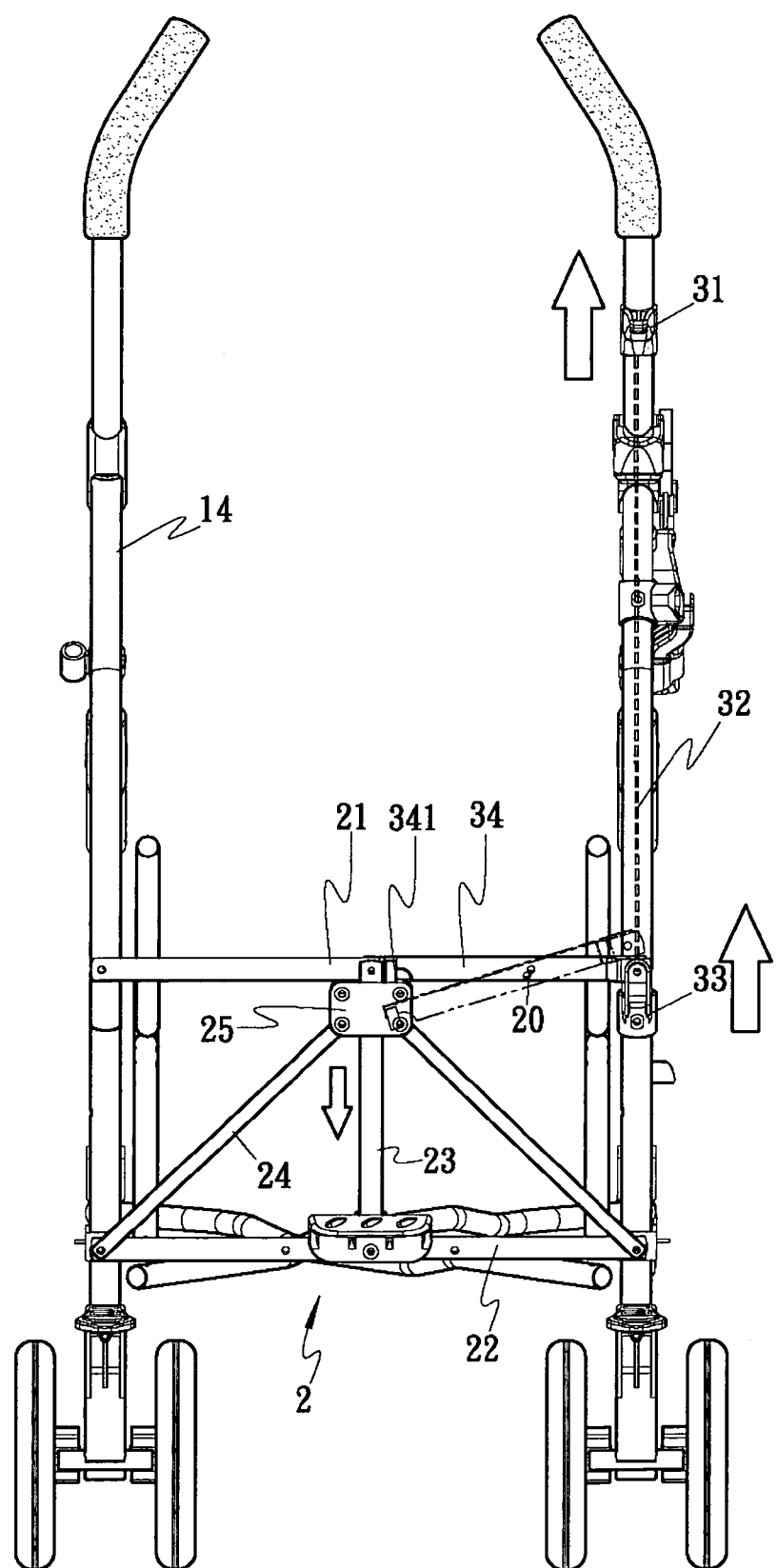
FIG. 5 is a schematic view of a folding movement of the folding set of the present invention.
Figure 6:
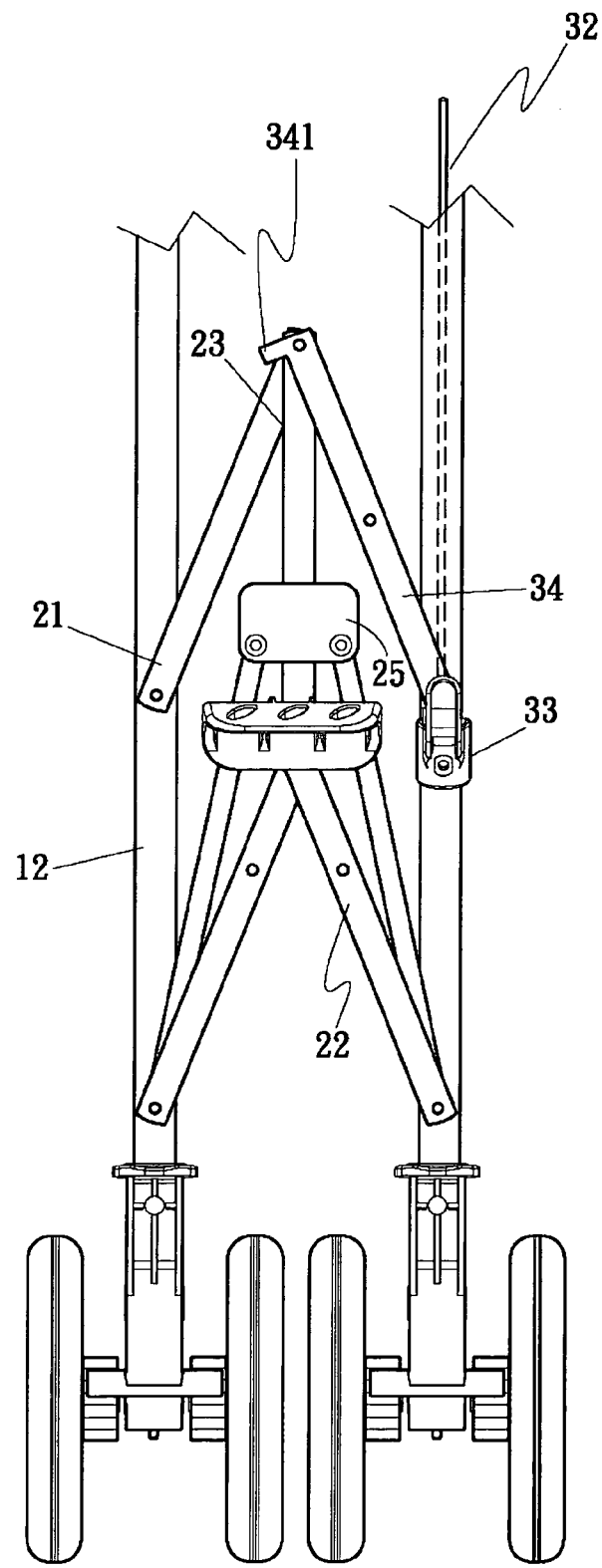
FIG. 6 is a schematic view of the folding set of the present invention after being folded.

Referring to FIGS. 4, 5, and 6, the folding set 2, having the same structure as the prior art, is pivotally connected between the rear leg tubes 12 of the frame 1. Through the expanding and releasing of the folding set 2, the expanding position or the folding position of the frame 1 is controlled. The folding set 2 includes two pairs of upper and lower steel pieces 21, 22, a conduit piece 23, a pair of connecting pieces 24, a driving piece 25, and a paddle 26, each pivotally connected to one another.

The single hand release structure 3 in accordance with this embodiment of the present invention includes a hand pull sliding sleeve 31, a connecting element 32, a driving sleeve 33, a driving lever 34, and a return spring (not shown). The hand pull sliding sleeve 31 can slidably move on the handle bar 14 of the frame 1 so as to provide the user with ease of operation within arm's reach. In this embodiment, the connecting element 32 is a flexible wire having one end connected to the hand pull sliding sleeve 31. The other end of the wire is connected to the driving sleeve 33 which is capable of sliding on the rear leg tube 12. The driving lever 34 is pivotally connected to the upper steel piece 21 of the folding set 2, and the other end of the driving lever 34 is connected to the driving sleeve 33.

Therefore, when the user pulls the hand pull sliding sleeve 31 upward, the driving lever 34 rotates in relation to the connecting element 32 and the driving sleeve 33. The driving lever 34 and the upper steel piece 21 are rotated at the connecting point 20 there between. The other end of the driving lever 34 is a free end 341, and is located above the driving piece 25. Thus, when the driving lever 32 rotates, the driving piece 25 is pushed downward by the free end 341 of the driving lever 34, so as to facilitate the folding of the folding set 2.

In the present embodiment, the main function of the driving lever 34 is to partially release the folding set 2; Thus, the driving sleeve 34 can drive the driving lever 34 to push the upper steel piece 21 or the lower steel piece 22 upward through the backward rotation of the driving sleeve 33, resulting in the partial folding of the folding set 2.

Figure 7:
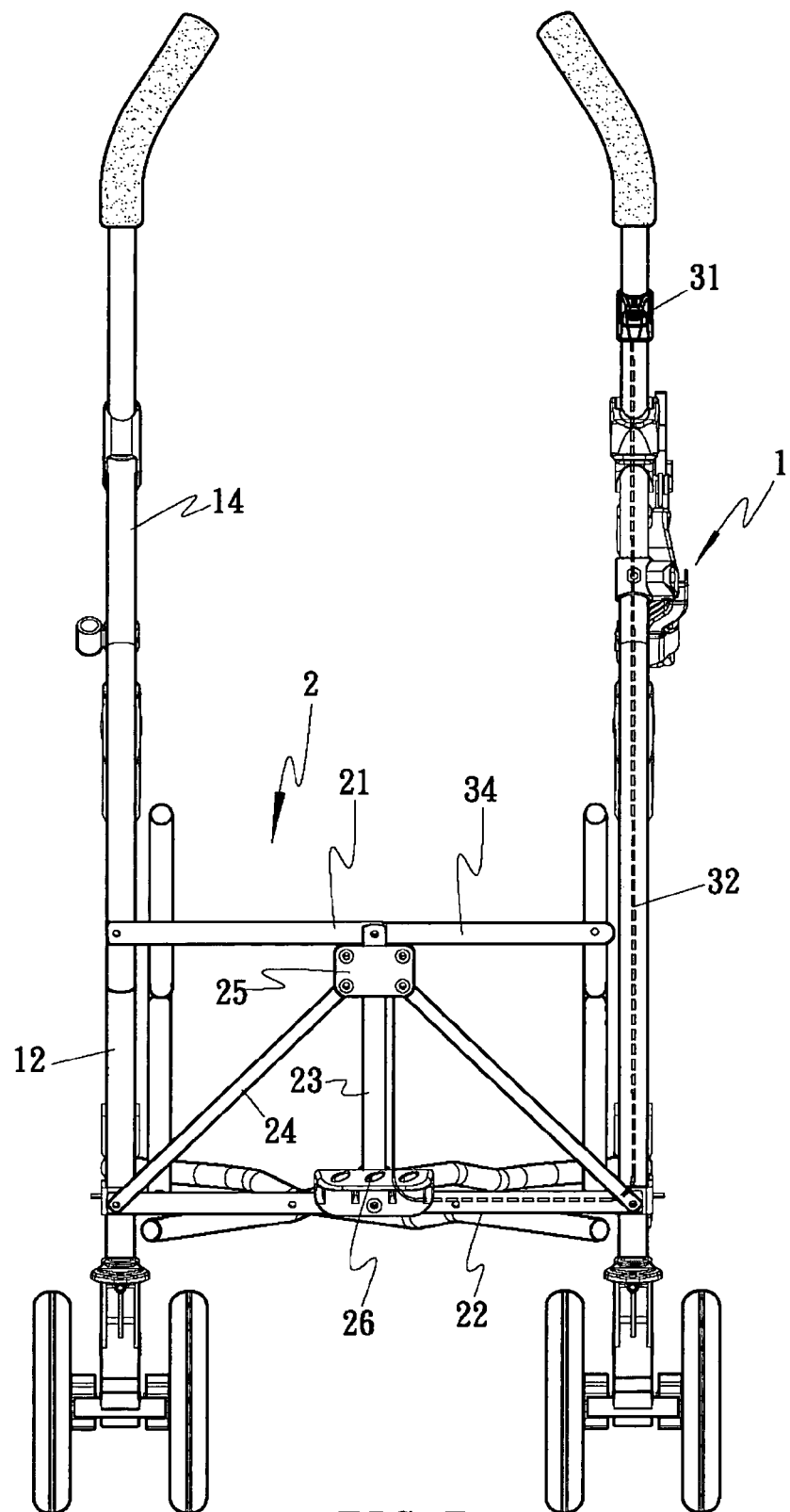
FIG. 7 is a schematic view of the connecting element of the present invention having one end directly connected to a driving piece.

Referring to FIG. 7, the alternate embodiment can connect one end of the connecting element 32 directly to the driving piece 25. When the hand pulls sliding sleeve 31, the connecting element 32 directly pulls the driving piece 25 downward, resulting in the partial folding of the folding set 2.

When the user utilizes the hand pull sliding sleeve 31 to push the driving piece 25, the folding set 2 is merely presented in a foldable position, but none of the folding points on the frame 1 of the umbrella folding stroller has moved. If the user directly pushes the handle bar 14 at this time, each element cannot rotate m relation to the handle bar 14 so as to fold the frame 1.

In the embodiment, the elastic element 4 is a tension spring disposed between the lower steel pieces 21 of the folding set 2. When the frame 1 of the umbrella folding stroller is expanded, the tension spring is expanded. When the user releases the folding set 2, each folding point on the frame 1 becomes rotatable so that the folding set 2 is partially folded through the return elasticity of the tension spring. The user can directly push the handle bar 14 so that the rest of the elements passing all the deadlock points of the rotation move in relation to the handle bar 14 resulting in the folding of the frame 1.

Alternatively, the main function of the elastic element 4 of the present invention is to assist the frame 1 to form into a partially rotatable folding position by using the elasticity to allow each connecting point to pass through the deadlock points when the driving piece 25 is pushed to release. Thus, the user can directly push the handle bar 14 so as to drive the other elements to pivotally fold. Therefore, in the embodiment, the elastic element 4 can also be a torsion spring. By disposing the torsion spring device at the connecting point between the rear leg tube 12 and the seat tube 15, the return torsion can be utilized to release the locking device. Then, the rear leg tube 12 and the seat tube 15 can correspondingly rotate to form the partial folding position of the frame 1. Subsequently, the user can directly push the handle bar 14 so as to fold the frame 1 of the stroller.

The above-mentioned preferred embodiments of the present invention are not intended to limit the scope of the present invention. Modifications and changes may be made in various embodiments of the present invention without leaving the scope and spirit of the present invention. The scope of the present invention is limited only by the language of the following claims.

What is claimed is:

1. An umbrella folding stroller comprising:
a frame having right and left sides, with each of the right and left sides having a handle bar, with the frame capable of being extended in an extended position for use and of being folded transversely and longitudinally in a collapsed position for storing;

a folding set pivotally connected between the right and left sides of a rear of said frame respectively so as to drive said frame to fold transversely; and a single hand release device disposed on said frame, with the single hand release device including a hand pull sliding sleeve and a connecting element, with the hand pull sliding sleeve slideably moving on the handle bar of one of the left and right sides of the frame, with the connecting element having a first end connected to the hand pull sliding sleeve, with the single hand release device driving said folding set through the connecting element into the collapsed position by movement of the connection element due to movement of the hand pull sliding sleeve on the handle bar.

2. The umbrella folding stroller of claim 1, wherein each of the left and right sides of said frame includes a front leg tube, a rear leg tube, a joint set, handle bar, and a seat tube, with the frame further including a lower cross tube; wherein said lower cross tube and said folding set are pivotally connected between the right and left sides of said frame respectively so as to support said frame, and when said frame is collapsed, the left and right sides of said frame are driven so as to be folded transversely.

3. The umbrella folding stroller of claim 2, further comprising an elastic element disposed between said seat tube and said rear leg tube so as to assist folding of said frame.

4. The umbrella folding stroller of claim 3, wherein said elastic element is a torsion spring.

5. The umbrella folding stroller of claim 1, wherein said folding set includes two pairs of upper and lower steel pieces, a conduit piece, a pair of connecting steel pieces, a driving piece, and a paddle, pivotally connected to each other.

6. The umbrella folding stroller of claim 5, wherein said single hand release device further includes a driving lever and a return spring; wherein said second end of said connecting element is connected to said driving lever to rotate due to movement of said hand pull sliding sleeve.

7. The umbrella folding stroller of claim 6, wherein said driving lever of said single hand release device is pivotally connected to said folding set, with a first end of said driving lever connected to said connection element, and wherein a second end of the driving lever is an open end, and is located on top of said driving piece of said folding set so as to allow said driving piece to be pushed in relation to the rotation of said driving lever.

8. The umbrella folding stroller of claim 7, further comprising an elastic element disposed on said folding set so as to assist folding of said folding set.

9. The umbrella folding stroller of claim 8, wherein said elastic element is disposed between said pair of lower steel pieces so as to assist folding of said folding set.

10. The umbrella folding stroller of claim 8, wherein said elastic element is a tension spring.

11. The umbrella folding stroller of claim 6, further comprising an elastic element disposed on said folding set so as to assist folding of said folding set.

12. The umbrella folding stroller of claim 11, wherein said elastic element is disposed between said pair of lower steel pieces so as to assist folding of said folding set.

13. The umbrella folding stroller of claim 11, wherein said elastic element is a tension spring.

14. The umbrella folding stroller of claim 6, further comprising an elastic element disposed between said seat tube and said rear leg tube so as to assist folding of said frame.

15. The umbrella folding stroller of claim 14, wherein said elastic element is a torsion spring.

16. The umbrella folding stroller of claim 5, wherein the second end of said connecting element is directly connected to said driving piece of said folding set such that said hand pull sliding sleeve directly pulls said driving piece to slide downward through said connecting element.

17. The umbrella folding stroller of claim 5, further comprising an elastic element disposed on said folding set so as to assist folding of said folding set.

18. The umbrella folding stroller of claim 17, wherein said elastic element is disposed between said pair of lower steel pieces so as to assist folding of said folding set.

19. The umbrella folding stroller of claim 17, wherein said elastic element is a tension spring.

20. The umbrella folding stroller of claim 1, wherein said single hand release device further includes a driving lever and a return spring; wherein said second end of said connecting element is connected to said driving lever to rotate due to movement of said hand pull sliding sleeve.

* * * * *